United States Patent
Anderson

[11] 3,866,689
[45] Feb. 18, 1975

[54] WING FRAME CONTROL MECHANISM FOR GROUND WORKING IMPLEMENT

[75] Inventor: Charles W. Anderson, Kewanee, Ill.

[73] Assignee: Kewanee Machinery & Conveyor Co., Kewanee, Ill.

[22] Filed: Jan. 31, 1973

[21] Appl. No.: 328,472

[52] U.S. Cl. .................................. 172/311, 172/456
[51] Int. Cl. ............................................ A01b 15/14
[58] Field of Search ............ 172/310, 311, 456, 315, 172/316, 126, 130; 280/411–413

[56] References Cited
UNITED STATES PATENTS

| | | | |
|---|---|---|---|
| 1,247,603 | 11/1917 | Ward | 74/521 |
| 3,126,689 | 3/1964 | Walker et al. | 172/316 X |
| 3,568,777 | 3/1971 | Hook | 172/311 X |
| 3,628,613 | 12/1971 | Kaufman | 172/311 |
| 3,650,333 | 3/1972 | Fueslein | 172/311 |
| 3,693,724 | 9/1972 | Fueslein et al. | 172/456 |
| 3,797,580 | 3/1973 | Roth | 172/311 |
| 4,692,121 | 9/1972 | Kenney | 172/456 |

FOREIGN PATENTS OR APPLICATIONS

| | | | |
|---|---|---|---|
| 680,759 | 10/1952 | Great Britain | 37/188 |

Primary Examiner—Edgar S. Burr
Assistant Examiner—Paul T. Sewell
Attorney, Agent, or Firm—Johnson, Dienner, Emrich & Wagner

[57] ABSTRACT

Mechanism for simultaneously raising or lowering wing frames of a ground working impelment or the like between first positions wherein the wing frames extend in substantially planar aligned relation with a main frame section and second positions disposed substantially 180° from their first operating positions and resting on the main frame.

7 Claims, 4 Drawing Figures

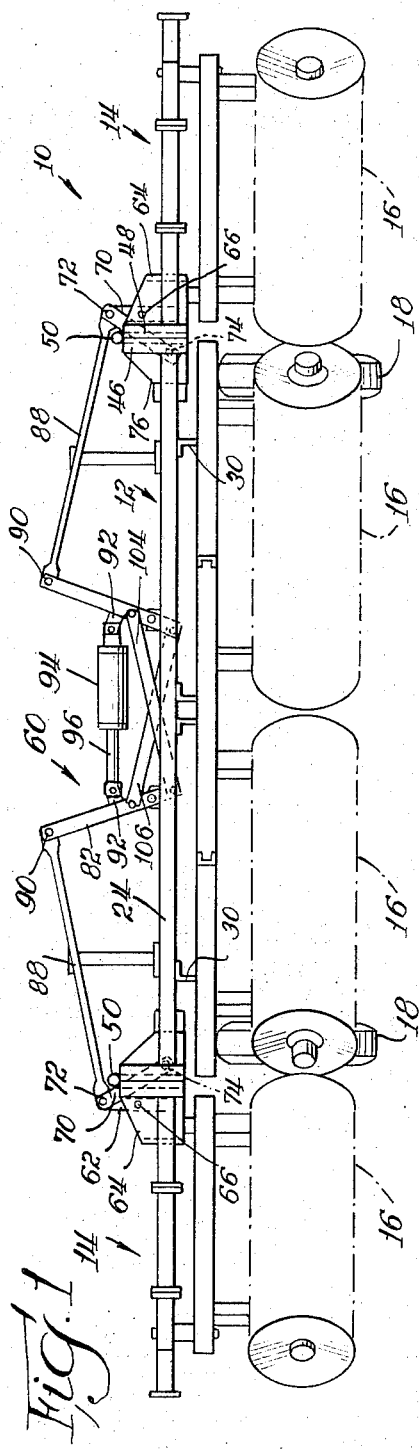
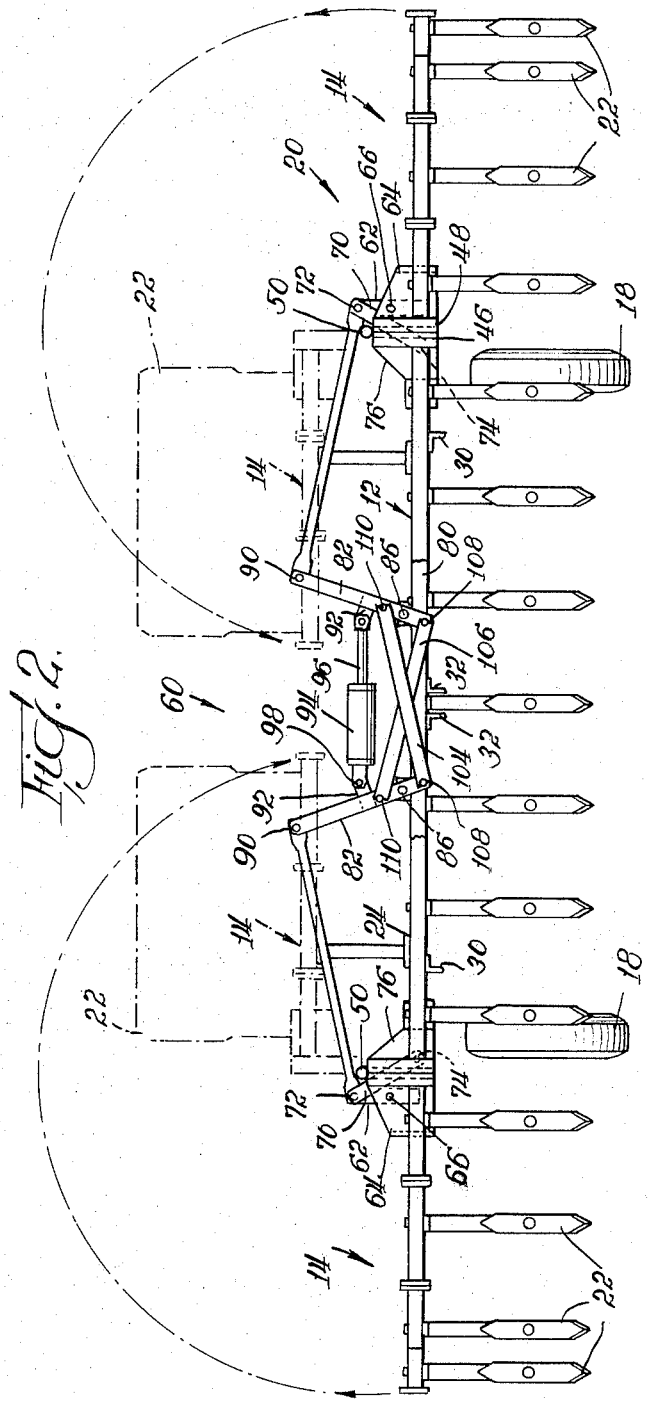

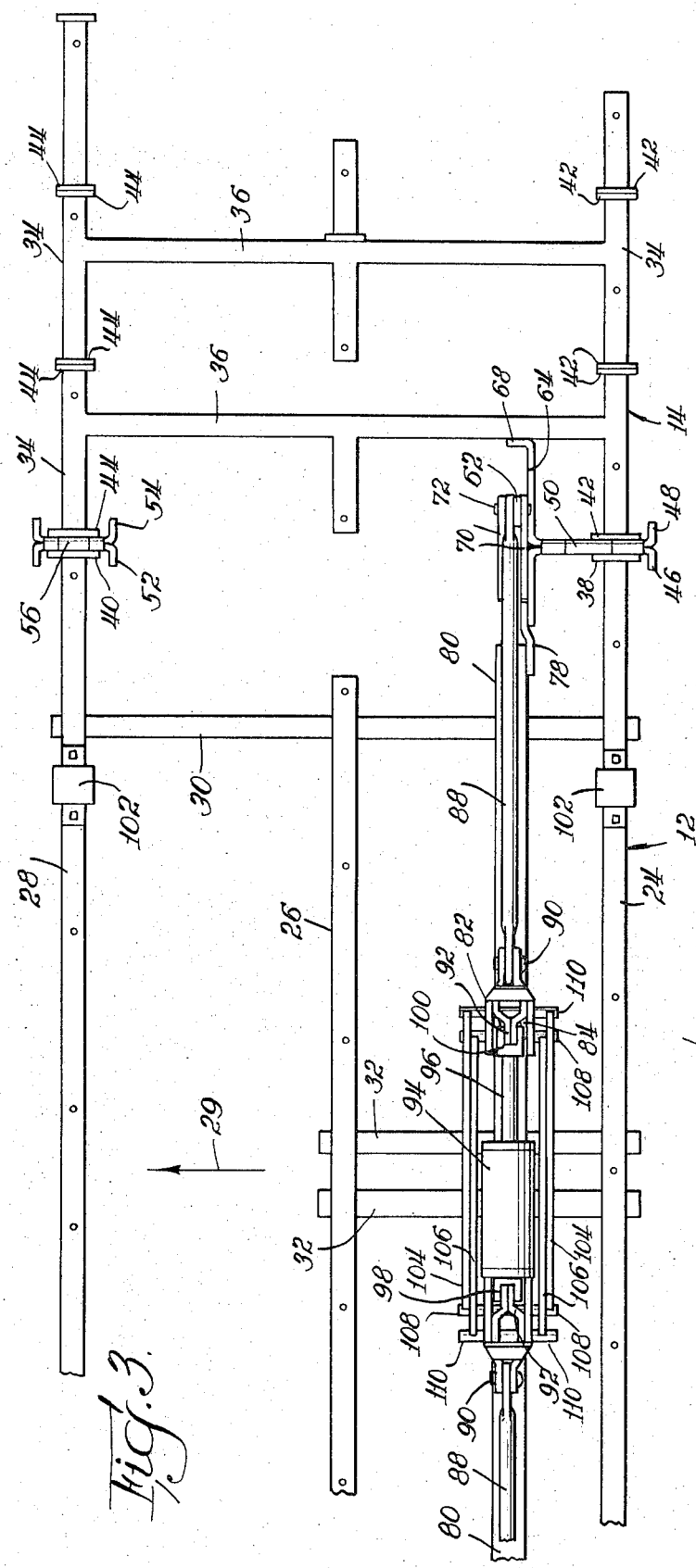
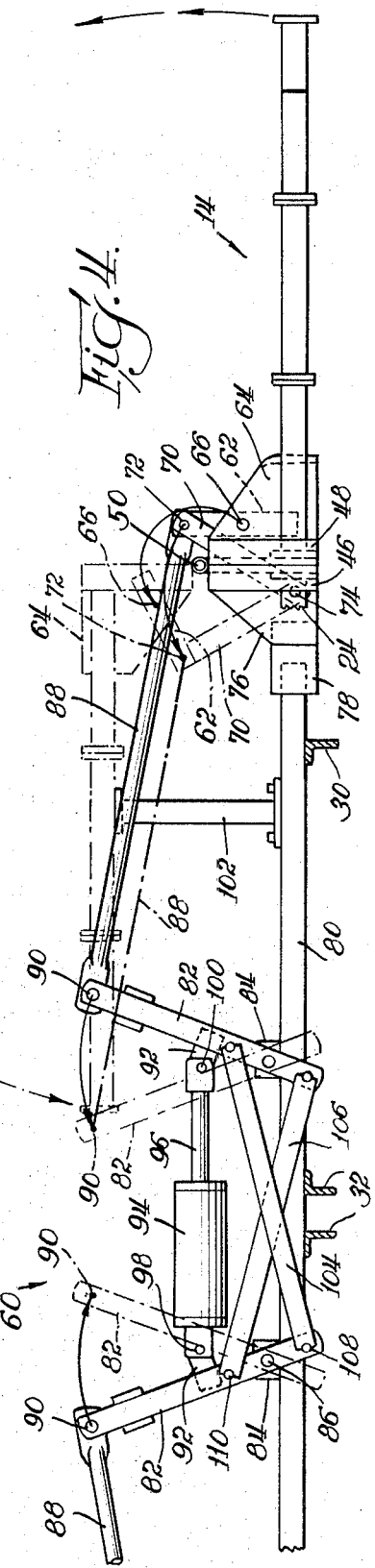

WING FRAME CONTROL MECHANISM FOR GROUND WORKING IMPLEMENT

BACKGROUND OF THE INVENTION

The present invention relates generally to ground working implements, and more particularly to novel mechanism for effecting simultaneous movement of wing frames between operating and non-operating positions.

It is known in the art of ground working implements such as disk harrows and field cultivators to employ wing frames which are pivotally mounted to a main frame section and are movable between operating positions wherein the wing frames extend outwardly from the main frame in generally planar alignment therewith to form extensions of the main frame, and raised non-operating positions as when the implement is being stored or transported to and from the fields. The main frame and wing frames support the ground engaging elements effective to work the ground in a desired manner.

Various mechanism are known for raising and lowering wing frames between their operating and non-operating positions. The known mechanisms vary from simple counterbalance arrangements which assist in raising pivotally connected wing frames such that the wing frames may each be manually moved to non-operating positions, as disclosed in U.S. Pat. No. 2,974,738, to more complex mechanical control mechanisms for effecting simultaneous movement of the wing frames from lowered operating positions to raised non-operating positions such as disclosed in U.S. Pat. Nos. 3,298,446, 3,401,752 and 3,568,777. In both of the latter two referenced U.S. patents, a single double-acting hydraulic cylinder is selectively operable to effect movement of the wing frames between their lowered operating positions and their raised non-operating positions.

The known wing frame control mechanisms for simultaneously raising the wing frames to non-operating positions effect movement of the wing frames from lowered positions to substantially upstanding positions wherein they require means for supporting the wing frames in such upstanding positions. The upstanding wing frames also define a high profile for the associated implement which requires a greater storage area and imposes greater limitations during transportation. The present invention provides an improvement over the prior art wing frame support and actuating mechanisms through providing means for moving the wing frames to positions substantially 180° from their lowered operating positions so that the wing frames rest upon the main frame during transportation. This eliminates the need for transport locks to retain the wing frames in their raised inoperative positions and also presents a substantially lower height profile for the implement than has heretofore been obtainable.

SUMMARY OF THE INVENTION

One of the primary objects of the present invention is to provide novel mechanism for effecting simultaneous raising or lowering of wing frames of a ground working implement.

Another object of the present invention is to provide novel mechanism for raising and lowering wing frames of a ground working implement wherein the mechanism is effective to move the wing frames through substantially 180° from their lowered operating positions such that the wing frames rest upon the main frame and present a low height profile.

Another object of the present invention is to provide novel mechanism for raising and lowering the wing frames of a ground working implement wherein the mechanism includes control arm means and actuating linkage means operative to effect simultaneous movement of the wing frames between operating positions wherein the wing frames extend outwardly from the main frame in substantially planar alignment therewith and non-operating positions wherein the wing frames are pivoted through substantially 180° to rest upon the main frame.

In carrying out the objects and advantages of the present invention, I have provided control mechanism means in combination with a ground working implement having a main frame and wing frames pivotally supported by the main frame for pivotal movement about generally horizontal axes between lowered operating positions extending outwardly from the main frame in generally planar alignment therewith and raised non-operating positions wherein the wing frames are pivoted through substantially 180° such that they rest on the main frame to present a low height profile and minimum width for transportation of the implement. The control mechanism means includes a pair of pivotally interconnected control arms associated with each of the wing frames, the common pivotal connection of each pair of such control arms in turn being pivotally connected to a third control arm through a connecting link. A relatively short stroke hydraulic or pneumatic cylinder and piston assembly interconnects the third control arms and is selectively operable to effect pivotal movement of the wing frames through substantially 180° beteen operating and non-operating positions resting on the main frame. The third control arms are further interconnected by cross links to effect simultaneous equal magnitude movement of the wing frames thereof in opposite pivotal directions.

Further objects and advantages of the present invention, together with the organization and manner of operation thereof, will become apparent from the following detailed description of a preferred embodiment of the invention when taken in conjunction with the accompanying drawing wherein like reference numerals designate like parts throughout the several views.

BRIEF DESCRIPTION OF THE DRAWINGS

FIG. 1 is a rear elevational view of a multi-section ground working disk harrow embodying control mechanism for raising and lowering the wing frames in accordance with the present invention;

FIG. 2 is a rear elevational view of a field cultivator employing wing frame control mechanism in accordance with the present invention, the wing assemblies being shown in their raised non-operating positions in phantom;

FIG. 3 is a partial plan view of the multi-section frame structure and wing frame control mechanism of FIG. 2; and FIG. 4 is an enlarged partial rear elevational view of the wing frame control mechanism of FIGS. 1 and 2.

DESCRIPTION OF A PREFERRED EMBODIMENT:

Referring now to the drawings, FIG. 1 illustrates a ground working implement, indicated generally at 10, comprising a disk harrow having portions thereof which form no part of the present invention removed for clarity. The disk harrow 10 includes a main frame, indicated generally at 12, and wing frames, each of which is indicated generally at 14, pivotally supported on the main frame on opposite sides thereof spaced laterally outwardly from the longitudinal axis of the main frame. The main frame 12 and each of the wing frames 14 have disk gangs 16 secured to the undersides thereof. The disk gangs 16 are of conventional design and include a plurality of axially aligned concave disks which serve to effect working of the ground when in ground engaging positions. The main frame 12 also has a pair of wheels 18 secured to the underside thereof through means which allow movement of the wheels to effect raising and lowering of the main frame and thereby the disks 16 relative to the ground in a known manner. Conventionally, the disks 16 are raised during transportation of the disk harrow and storage thereof, and are lowered to ground engaging positions for working of the ground. The manner of supporting the disk gangs 16 and the particular means for manipulating the wheels 16 relative to the main frame 12 form no part of the present invention and will not be described in greater detail herein.

FIG. 2 illustrates another embodiment of a ground working implement employing the present invention. The ground working implement of FIG. 2 comprises a field cultivator, indicated generally at 20, which includes a main frame, indicated generally at 12, and wing frames, indicated generally at 14, in similar fashion to the disk harrow of FIG 1. The field cultivator 20 is generally similar in operation to the disk harrow 10 except that it employs downwardly depending ground engaging shanks 22 secured to the undersides of the main frame 12 and wing frames 14 for selective engagement with the ground through raising and lowering of the wheels 18 relative to the main frame 12.

With reference to FIGS. 1 and 2, taken in conjunction with FIGS. 3 and 4, the main frames 12 of both the disk harrow 10 and the field cultivator 20 include rear, intermediate and forward transverse beams or frame members 24, 26 and 28, respectively, considered with the machines normally moved in a forward direction as indicated by arrow 29 in FIG. 3. The transverse frame members 24, 26 and 28 may be of any desired structural cross sectional configuration such as tubular or I-section having suitable structural strength. The rear, middle and forward transverse frame members are secured in fixed parallel spaced relation by longitudinally extending frame angle members, one of which is shown at 30. The rearward and intermediate frame members 24 and 26 further have secured to their lower surfaces a pair of support angles 32 which are spaced equally laterally outwardly from and parallel to the longitudinal axis of the ground working implement.

The wing frames 14 are illustrated as including a plurality of similar sections each of which has parallel frame members 34 secured on the opposite ends of a longitudinally extending frame member 36. The frame members 34 of the wing section adjacent the main frame are secured to the outer lateral end portions of the frame members 24 and 28 through pivotal connections. To this end, the outer lateral ends of the main frame members 24 and 26 have flanges 38 and 40, respectively, secured thereon with the planes of the flanges in normal relation to the longitudinal axes of the frame members 24 and 28. Similar flanges 42 and 44 are provided on the adjacent inward ends of the frame members 34 of the wing frames. The flanges 38 and 42 are suitably secured to plate portions 46 and 48, respectively, of a hinge member defining a hinge axis 50 disposed vertically above the plane of the main frame 12. Similarly, the flange 40 and 44 are suitably secured to the plate portions 52 and 54, respectively, of a hinge member defining a hinge axis 56 axially aligned with the hinge axis 50.

As noted, the outer wing frames 14 may comprise a plurality of similar sections which are selectively secured in planar aligned relation to vary the outward lengths of wing frames. The particular frame construction illustrated may be varied in accordance with the present invention, it being only desirable that the outer wing frame sections be pivotally secured to and supported laterally from the opposite sides of the main fame section as through the horizontally aligned hinge axes 50 and 56.

The present invention is directed to means for simultaneously moving the wing frames 14 from operative working positions wherein they are disposed in substantially planar alignment with the main frame 12, as illustrated in solid lines in the drawings, to non-operating or raised positions wherein the wing frames are disposed substantially 180° from their operating positions at rest over the main frame, as illustrated in phantom in FIGS. 2 and 4. To this end, the ground working implements are provided with control mechanism means, indicated generally at 60, operatively associated with the wing frames for simultaneously moving them between their operating and non-operating positions. While the control mechanism means 60 will be described in conjunction with one of the wing frames 14, it will be understood that the control arm and linkage arrangements for each of the opposed wing frames are identical.

The control mechanism means 60 includes a first control arm or connecting link 62 associated with each of the wing frames 14, each of the control arms 62 being pivotally connected to an upstanding flange portion 64 of the associated hinge plate 48 through a suitable pivot pin connection 66. Noting FIG. 3, the upstanding flange portion 64 of the hinge plate 48 extends laterally outwardly at substantially 90° from the hinge axis 50 and is secured at its outermost end 68 to the cross frame 36 of the associated wing frame 14. The first control arm 62 associated with each of the wing frames 14 through the hinge flange 64 is also pivotally connected to a second control arm 70 through a pivotal connection 72, the control arm 70 comprising a pair of parallel spaced arm members which receive the upper end of the associated first control arm 62 therebetween. The end of each control arm 70 opposite its pivtal connection 72 to the associated first control arm 62 is pivotally connected at 74 to an upstanding flange 76 which is preferably formed integral with the hinge plate 46 and extends in a direction 90° to the hinge axis 50. Each upstanding flange 76 has a mounting plate 78 suitably affixed thereto which, in turn, is fixedly secured to an end of a support beam 80. The support beam 80 extends in transverse relation to the longitudinal axis of the main frame 12 and is secured to the upper surfaces of the longitudinally upstanding frame angles 30 and 32.

As shown in the drawings, the length of each first control arm 62, considered between its pivotal connections 66 and 72 is shorter than the length of the associated control arm 70, considered between its pivotal connections 72 and 74, and the common pivotal connection 72 therebetween is disposed at a vertical height above the hinge axis 50 as shown in FIG. 4. In the operating or extended position of the wing frame shown by the full lines in FIG. 4, the common pivotal connections 72 of control arms 62, 70 are spaced vertically over pivotal connection 66.

The control mechanism means 60 further includes actuating means interconnecting the common pivotal connections 72 between each pair of first and second control arms 62 and 70, respectively, to effect selective movement of the common pivotal connections 72 toward each other. With the first and second control arms 62 and 70, respectively, having configurations as described, movement of the common pivotal connections 72 toward each other will effect pivotal movement of the associated wing frames 14 upwardly about their pivot axes 50 and 56. The actuating means for effecting such pivotal movement of the wing frames includes a pair of third control arms 82 which are of equal length and longer than control arms 62, 70 pivotally supported by the transverse support beam 80 slightly outwardly from the longitudinal axis of the main frame 12. Each of the third control arms 82 comprises a pair of integrally connected arms spaced sufficiently at their lower ends to be received over opposite sides of the support beam 80 and pivot shaft support plates 84 which are secured on opposite vertical surfaces of the beams 80. Each pair of pivot shaft support plates 84 supports a pivot shaft 86 thereon the opposite ends of which are received through suitable openings in the corresponding third control arms 82 to provide a pivot axis therefor.

The upper end of each of the third control arms 82 is interconnected to the common pivotal connection 72 on the same side of the longitudinal axis of the ground working implement through a control link 88 the opposite ends of which are pivotally connected to the third control arm at 90 and to the associated pivotal connection 72.

Each of the third control arms 82 further has connection bracket means 92 to and between its spaced arm elements intermediate their lengths. The connection bracket means 92 have extendible control means connected therebetween comprising a hydraulic or pneumatic cylinder 94 having a piston 96 selectively extendible and retractable relative to the cylinder 94. The cylinder 94 is pivotally connected to one of the connecting bracket means 92 through a pivot pin connection 98, while the outer end of the piston 96 is pivotally connected to the other connecting bracket means 92 through a pivot pin connection 100. The hydraulic or pneumatic cylinder 94 is connected to a source of hydraulic or pneumatic pressure through a conventional control valve and associated fluid flow lines (not shown) such that the piston 96 may be selectively extended and retracted relative to the cylinder 94 to effect pivotal movement of the associated third control arms 82 about their respective pivotal axes 86.

To insure simultaneous movement of the wing frames 14 as the control arms 82 are pivoted about their pivot axes 86, cross links 104 and 106 are secured to and between the control arms 82 as shown in FIGS. 3 and 4. The cross links 104 and 106 are of equal length and each has its opposite ends pivotally connected to the third control arms 82 through pivot shafts 108 and 110, respectively, located on opposite sides of pivotal axis 86, pivot shafts 110 being shown disposed between pivot axis 86 and bracket 92 to which the extendible control means 94, 96 pivotally connect. With the cross link arrangement 104 and 106 as illustrated, movement of either of the third control arms 82 about its pivotal axis will effect equal movement of the other of the third control arms about its pivotal axis in an opposite pivotal direction.

As the control arms 82 are pivoted about their respective pivot axes, the control links 88 are moved to effect a corresponding pivotal movement of the associated first and second control arms 62 and 70. The illustrated geometrical relationship of the first, secnd and third control arms 62, 70 and 82, respectively, and their associated control link 88 is such that a relatively short stroke of the piston 96, such as 8 inches, will effect upward pivotal movement of the wing frames 14 about their pivot axes 50 and 56 through substantially 180° from their downward operating positions wherein they are generally planar with the main frame 12. The main frame 12 includes upstanding support arms 102 to engage and support the wing frames 14 when they are moved to their upward inoperative positions as illustrated in phantom in FIG. 4. In this manner, when the wing frames are moved to their upward non-working positions, they rest on the support members 102 of the main frame 12 in equilibrium thereby eliminating the need for transport locks to hold the wing frames in their raised positions.

By providing control mechanism means 60 between the pivotally supported wing frames 14 as described, the wing frames may be moved simultaneously between their lowered operative positions and their raised inoperative positions wherein they are disposed substantially 180° from their lowered operating position to rest on the support members 102 of the main frame means 12. The specific control arm and interconnecting linkage arrangement of the present invention allows such 180° movement of the wing frames through a relatively short stroke operating cylinder and piston arrangement 94, 96 and serves to position the wing frames at a minimum height for transportation and storing of the associated ground working implement. Additionally, by pivotally moving the wing frames to non-operating positions directly overlying the main frame 12 as described, a minimum width for the associated ground working implement is obtained which is further beneficial during transport and storage of the implement.

Having described a preferred embodiment of the present invention, it will be understood that changes and modifications may be made therein without departing from the invention in its broader aspects.

I claim:

1. In a ground working implement having a main frame and a pair of wing frames supported by the main frame on opposite sides thereof for pivotal movement about horizontal axes between operating positions wherein the wing frames extend outwardly from the main fame in substantially planar alignment therewith and non-operating positions raised 180° from their operating positions wherein the wings are disposed horizontal and at rest on support members of the main frame; the combination therewith of control means comprising first control arms pivotally connected to each of the wing frames, second control arms pivotally connected to the main frame inwardly of and below said horizontal axes on which the wing frame pivotally move, third control arms pivotally connected to the main frame inwardly of said second control arms, each said first control arms being pivotally connected to one of said second control arms, and a control link pivotally interconnected between a respective one of said pivotally connected first and second control arms and a respective one of the third control arms, actuating means interconnecting said third control arms and operatively movable between first and second positions to effect selective movement of the wing frames through pivoting of said control arms and links, and cross linkage means interconnecting said third control arms for effecting simultaneous equal and opposite pivotal movements of the wing frames through substantially 180° between their operating and non-operating positions upon said actuating means moving between the first and second positions.

2. In a ground working implement having a main frame and a pair of wing frames hingedly supported by the main frame on opposite sides thereof for swinging movement about generally horizontal axes between operating positions wherein the wing frames extend outwardly from the main frame in substantially planar alignment therewith and non-operating horizontal positions wherein the wing frames are at rest on supporting members of the main frame, the combination therewith of control mechanism means operatively associated with the wing frames for moving them through substantially equal and opposite pivotal movements of substantially 180° between their operating and non-operating positions, said control mechanism means including first and second common pivot connected control arms, the first of said control arms being pivotally connected to the associated wing frame outwardly of the horizontal axis on which the wing frame swings and the second control arm being pivotally connected to the main frame inwardly of said horizontal axis, third control arms pivotally connected to the main frame inwardly of the pivotal connection of the second control arms thereto, a control link interconnecting said common pivot connection of each pair of said first and second control arms with an adjacent one of said third control arms, extendible means interconnecting said third control arms and selectively operable to move said common pivot connections in directions toward and away from each other to effectively vary the spacing of said common pivot connections, and cross linkage means interconnecting said third control arms for effecting simultaneous equal and opposite pivotal movements of said wing frames as said wing frames move between their operating and non-operating positions in response to operation of said extendible means.

3. In a ground working implement having a main frame and a pair of wing frames hingedly supported by the main frame on opposite sides thereof for swinging movement about generally horizontal axes between operating positions wherein the wing frames extend outwardly from the main frame in substantially planar alignment therewith and non-operating horizontal positions wherein the wing frames rest on supporting members of the main frame, the combination therewith of control mechanism means operatively associated with the wing frames for moving them through substantially equal and opposite pivotal movements of substantially 180° between their operating and non-operating positions, said control mechanism means including first and second common pivot connected control arms, the first of said control arms being pivotally connected to the associated wing frame outwardly of the horizontal axis on which the wing frame swings, the second control arm being pivotally connected to the main frame inwardly of said horizontal axis, and third control arms pivotally connected to the main frame inwardly of the pivotal connection of the second control arms thereto, wherein the second control arms are longer than the first control arms and the third control arms are longer than the second control arms, a control link interconnecting said common pivot connection of each pair of said first and second control arms with an adjacent one of said third control arms, extendible means interconnecting said third control arms and selectively operable to move said common pivot connections in directions toward and away from each other to effectively vary the spacing of said common pivot connections, and cross linkage means interconnecting said third control arms for effecting simultaneous equal and opposite pivotal movements of said wing frames as said wing frames move between their operating and non-operating positions in response to operation of said extendible means.

4. The combination of claim 3 wherein the common pivot connections of the first and second control arms lie outwardly of and above the horizontal axes on which the wing frames pivot when they are in their extended operating positions, the pivotal connection of each first control arms to the wing frame then being disposed below and generally in a vertical plane containing its said common pivot connection.

5. In a ground working implement having a main frame and a pair of wing frames hingedly supported by the main frame on opposite sides thereof for swinging movement about generally horizontal axes between operating positions wherein the wing frames extend outwardly from the main frame in substantially planar alignment therewith and non-operating horizontal positions wherein the wing frames rest on supporting members of the main frame, the combination therewith of control mechanism means operatively associated with the wing frames for moving them through substantially equal and opposite pivotal movements of substantially 180° between their operating and non-operating positions, said control mechanism means including first and second common pivot connected control arms, the first of said control arms being pivotally connected to the associated wing frame outwardly of the horizontal axis on which the wing frame swings and the second control arm being pivotally connected to the main frame inwardly of said horizontal axis, the first control arms being of shorter length than the second control arms, and the common pivot connection of the first and second control arms lying outwardly of and above the horizontal axis on which the wing frame pivots when it is in its extended operating position, the pivotal connection of the first control arm to the wing frame then being disposed below and generally in a vertical plane containing said common pivot connection, third control arms pivotally connected to the main frame inwardly of the pivotal connection of the second control arms thereto, a control link interconnecting said common pivot connection of each pair of said first and second control arms with an adjacent one of said third control arms, extendible means interconnecting said third control arms and selectively operable to move said common pivot connections in directions toward and away from each other to effectively vary the spacing of said common pivot connections, and cross linkage means interconnecting said third control arms for effecting simultaneous equal and opposite pivotal movements of said wing frames as said wing frames move between their operating and non-operating positions in response to operation of said extendible means.

6. In a ground working implement having a main frame and a pair of wing frames hingedly supported by the main frame on opposite sides thereof for swinging movement about generally horizontal axes between operating positions wherein the wing frames extend outwardly from the main frame in substantially planar alignment therewith and non-operating horizontal positions wherein the wing frames rest on supporting members of the main frame, the combination therewith of control mechanism means operatively associated with the wing frames for moving them through substantially equal and opposite pivotal movements of substantially 180° between their operating and non-operating positions, said control mechanism means including first and second common pivot connected control arms, the first of said control arms being pivotally connected to the associated wing frame outwardly of the horizontal axis on which the wing frame swings and the second control arm being pivotally connected to the main frame inwardly of said horizonal axis, third control arms pivotally connected to the main frame inwardly of the pivotal connection of the second control arms thereto, a control link interconnecting said common pivot connection of each pair of said first and second control arms with an adjacent one of said third control arms, said extendible means being thereby selectively operable to move said common pivot connections in directions toward and away from each other to effectively vary the spacing of said common pivot connections, extendible means interconnecting said third control arms comprising extendible piston means including a cylinder and piston assembly having opposite end portions connected to the third control arms at a distance spaced from the pivotal connections of said third control arms through the main frame such that extension of the pivot means effects pivotal movement of the third control arms in directions outwardly from the longitudinal axis of the main frame, and cross linkage means interconnecting said third control arms for effecting simultaneous equal and opposite pivotal movements of said wing frames as said wing frames move between their operating and non-operating positions in response to operation of said extendible means.

7. The combination of claim 6 wherein the cross linkage means comprises a pair of cross links of equal length and pivotally connected at their opposite ends to the third control arms, each of said cross links having one end pivotally connected to one third arm above its pivotal connection to the main frame and having its other end pivotally connected to the other third control arm below its pivotal connection to the main frame.

* * * * *